US012020073B2

(12) United States Patent
Beach

(10) Patent No.: US 12,020,073 B2
(45) Date of Patent: Jun. 25, 2024

(54) WORKFLOW AUTOMATION UTILIZING METADATA STRUCTURE

(71) Applicant: Dell Products L.P., Round Rock, TX (US)

(72) Inventor: Walter John Beach, Burnaby (CA)

(73) Assignee: Dell Products L.P., Round Rock, TX (US)

( * ) Notice: Subject to any disclaimer, the term of this patent is extended or adjusted under 35 U.S.C. 154(b) by 427 days.

(21) Appl. No.: 17/470,205

(22) Filed: Sep. 9, 2021

(65) Prior Publication Data

US 2023/0070063 A1 Mar. 9, 2023

(51) Int. Cl.
*G06F 9/50* (2006.01)
*G06F 3/0482* (2013.01)

(52) U.S. Cl.
CPC .......... *G06F 9/5038* (2013.01); *G06F 3/0482* (2013.01); *G06F 2209/505* (2013.01)

(58) Field of Classification Search
CPC . G06F 9/5038; G06F 3/0482; G06F 2209/505
See application file for complete search history.

(56) References Cited

U.S. PATENT DOCUMENTS 7,805,327 B1 * 9/2010 Schulz .................. G06F 9/5038 705/7.26
11,025,707 B1 * 6/2021 Luker ................. H04L 41/5054
2007/0150480 A1 * 6/2007 Hwang ............. H04M 3/42161
2013/0263156 A1 10/2013 Nakagawa et al.
2014/0297354 A1 * 10/2014 Kogiso ..................... G06F 9/46 705/7.26
2016/0026947 A1 * 1/2016 Kornienko ....... G06Q 10/06316 705/7.26
2016/0301561 A1 10/2016 Petersen et al.
2018/0365608 A1 * 12/2018 Powell ............. G06Q 10/06393

(Continued)

OTHER PUBLICATIONS

VMware, Inc. "vRO Plug-in for Dell EMC XtremIO," https://marketplace.vmware.com/vsx/solutions/vro-plug-in-for-dell-emc-xtremio-4-0, Accessed Jan. 6, 2020, 5 pages.

(Continued)

*Primary Examiner* — Dong U Kim
(74) *Attorney, Agent, or Firm* — Ryan, Mason & Lewis, LLP

(57) ABSTRACT

An apparatus comprises a processing device that is configured to obtain a metadata structure corresponding to a workflow automation. The metadata structure defines a first tier comprising individual tasks, a second tier comprising a plurality of workflows each comprising a grouping of the individual tasks and a third tier comprising an orchestration comprising a grouping of the workflows. The processing device is configured to generate a graphical user interface (GUI) based on the metadata structure that is configured to present the plurality of tiers to a user. The GUI comprises a plurality of elements each activatable to enable or disable corresponding individual tasks and workflows. The GUI is presented to a user and an activation of a given element is received from the user. The activation disables the corresponding individual task or workflow for the workflow automation. The workflow automation is executed based at least in part on the activation.

20 Claims, 9 Drawing Sheets

(56) References Cited

U.S. PATENT DOCUMENTS

| | | | | |
|---|---|---|---|---|
| 2019/0155786 | A1 | 5/2019 | Rees | |
| 2019/0324893 | A1* | 10/2019 | Vaishnav | G06F 11/3664 |
| 2019/0370160 | A1 | 12/2019 | Raman et al. | |
| 2021/0004273 | A1* | 1/2021 | You | G06F 9/5027 |
| 2021/0034410 | A1* | 2/2021 | Dh | G06F 9/5038 |
| 2021/0034439 | A1* | 2/2021 | Vaishnav | G06F 11/3688 |
| 2021/0224084 | A1 | 7/2021 | Molchanov et al. | |
| 2022/0318067 | A1* | 10/2022 | Nayak | G06F 9/542 |

OTHER PUBLICATIONS

Dell EMC, "Implementing a Private Cloud with VMware vRealize and Dell EMC XtremIO X2," Apr. 2018, 131 pages.

K. Dolan, "Dell EMC XtremIO X2: Delivering High Performance and Advanced Functionality for Virtualized Environments," Enterprise Strategy Group, ESG Lab Review, Jul. 18, 2018, 11 pages.

VMware, Inc. "Developing with VMware vRealize Orchestrator," 2018, 296 pages.

VMware, Inc. "VMware vRealize Orchestrator," Datasheet, 2019, 2 pages.

VMware, Inc. "vRealize Orchestrator Coding Design Guide," Technical White Paper, Mar. 2016, 30 pages.

* cited by examiner

214

| | 300 | 302 | 304 | 306 | 308 | 310 | 312 | 314 | 316 | 318 |
|---|---|---|---|---|---|---|---|---|---|---|
| | **Address** | **Device Type** | **Type** | **Role** | **Group** | **Step** | **Progress** | **Status** | **Details** | **Log** |
| ☑ | 12.345.678.910 | Device Type 1 | Storage | MDM | G1 | Check MDI | 0 | Running | Details | Log |
| ☑ | 10.987.654.321 | Device Type 1 | Virtualization | SDS | G1 | Collect Data | 0 | Started | Details | Log |
| ☑ | 34.567.546.245 | Device Type 1 | Collect | Tiebreaker | G2 | Collect Data | 0 | Started | Details | Log |
| ☑ | 27.625.648.391 | Device Type 2 | Compute | Customer | F1 | Collect Data | 0 | Started | Details | Log |
| ☑ | 90.785.365.152 | Device Type 3 | Virtualization | Customer | F3 | Check VM Power State | 0 | Started | Details | Log |
| | | | | | . . . | | | | | |
| ☑ | 63.456.981.237 | Device Type 1 | Storage | SDS | S5 | Collect Data | 0 | Started | Details | Log |

Task Details

| | | | | | |
|---|---|---|---|---|---|
| **Orchestration:** | Orchestration 1 | **SubOrchestration:** | SubOrchestration 1 | **Address:** | 10.987.654.321 |
| **Role:** | SDS | **Device Type:** | Device Type 1 | **Group:** | |

| **Workflow** | **Task** | **Step** | **Method** | **Status** | **Run** | **Output** |
|---|---|---|---|---|---|---|
| Collect Folder Contents | Get Folder | Check LIA/SDS | Started | Informational | 20210712_141615.486 | Output |
| Collect Folder Contents | Get Folder | Check LIA/SDS | Collect | Success | 20210712_141618.930 | Output |
| Collect Folder Contents | Get Folder | Check LIA/SDS | Complete | Informational | 20210712_141619.552 | Output |

402

STEP OUTPUT: CHECK LIA/SDS

Configure_networks.sh
Lia-install.log
Mdm-install.log
Mdm-uninstall.log
Sds-install.log
Installer.log
Partitions
Mdm
System-private-e8569e2756h47459d4028jy23837dh548-abc.def.ghi
Root_123-4567890123
Root_987-6543210987

| | | | |
|---|---|---|---|
| **Orchestration 1** | | | |
| | | | |
| **Step** | **Component** | **Type** | **Average Time** |
| **Collect Device Type 1** | | | |
| Flush DNS | | | |
| Flush DNS | Localhost | Command | 00:00:03 |
| Collect Device Type | | | |
| Collect Data | Device Type 1 | Collect | 00:00:35 |
| Collect Firmware | Device Type 1 | Collect | 00:00:32 |
| | | | |
| **Collect Device Type 2** | | | |
| Collect Device Type | | | |
| Collect Data | Device Type 2 | Collect | 00:00:22 |
| Collect Device Type | | | |
| Collect Data | Device Type 2 | Collect | |
| . . . . | | | |

| Device Type 1 | | | | |
| --- | --- | --- | --- | --- |
| **Address** | **Device Type** | **Type** | **Role** | **Group** |
| 12.345.678.910 | Device Type 1 | Storage | MDM | F1 |
| 10.987.654.321 | Device Type 1 | Storage | SDS | F1 |
| 34.567.546.245 | Device Type 1 | Storage | SDS | F2 |
| 27.625.648.391 | Device Type 1 | Storage | MDM | G2 |
| 90.785.365.152 | Device Type 1 | Storage | SDS | G2 |
| 63.456.981.237 | Device Type 1 | Storage | SDS | S1 |
| 18.276.918.495 | Device Type 1 | Storage | TieBreaker | S2 |

| | | | | | | | | | |
|---|---|---|---|---|---|---|---|---|---|
| **Task:** | Upgrade Non-Primary | | | **Group:** | 12.345.678.910 | | | | |
| | | | | | | | | | |
| **Address** | **Device Type** | **Type** | **Role** | **Group** | **Step** | **Progress** | **Status** | **Details** | **Log** |
| 12.345.678.910 | Device Type 1 | Storage | MDM | G1 | Check MDI | 0 | Running | Details | Log |

| | | | | | | | | | |
|---|---|---|---|---|---|---|---|---|---|
| **Task:** | Upgrade Non Primary | | | **Group:** | F1 | | | | |
| | | | | | | | | | |
| **Address** | **Device Type** | **Type** | **Role** | **Group** | **Step** | **Progress** | **Status** | **Details** | **Log** |
| 12.345.678.910 | Device Type 1 | Storage | MDM | F1 | Check MDI | 50% | Running | Details | Log |
| 10.987.654.321 | Device Type 1 | Storage | SDS | F1 | Check MDI | 0 | Started | Details | Log |

FIG. 8

WORKFLOW AUTOMATION UTILIZING METADATA STRUCTURE

FIELD

The field relates generally to information processing systems, and more particularly to workflow automation of tasks in information processing systems.

BACKGROUND

Managing information technology (IT) tasks can be challenging, particularly as IT environments and infrastructure continue to grow in complexity. Various tools may be used to simplify the workflow automation of complex IT tasks, such as management and operational tasks for configuring and checking the status of assets and resources in IT environment. The orchestration of workflow automation typically involves the use of a variety of commands on the assets and resources of the IT environment. Effectively coordinating the use of these commands in an IT environment having a diverse array of assets and resources can be challenging.

SUMMARY

In one embodiment, an apparatus comprises at least one processing device comprising a processor coupled to memory. The at least one processing device is configured to obtain a metadata structure corresponding to a workflow automation. The workflow automation comprises a plurality of tasks. The metadata structure defines a plurality of tiers including a first tier comprising individual tasks of the plurality of tasks, a second tier comprising a plurality of workflows, each workflow comprising a grouping of at least a subset of the individual tasks of the first tier, and a third tier comprising at least one orchestration, each orchestration comprising a grouping of at least a subset of the workflows of the second tier. The at least one processing device is further configured to generate a graphical user interface (GUI) based at least in part on the metadata structure. The GUI is configured to present the plurality of tiers to a user. The GUI comprises a plurality of elements each activatable by the user to enable or disable corresponding ones of the individual tasks and workflows for the workflow automation. The at least one processing device is further configured to present the GUI to a user of the apparatus and to receive via the GUI, from the user, an activation of a given element of the plurality of elements. The activation disables the corresponding individual task or workflow for the workflow automation. The at least one processing device is further configured to execute the workflow automation based at least in part on the activation of the given element.

These and other illustrative embodiments include, without limitation, apparatus, systems, methods and processor-readable storage media.

BRIEF DESCRIPTION OF THE DRAWINGS

FIG. 3 illustrates an example component pane of the GUI of FIG. 2 in an illustrative embodiment.

FIG. 4 illustrates example details and output panes of the GUI of FIG. 2 in an illustrative embodiment.

FIG. 5 illustrates an example summary pane of the GUI of FIG. 2 in an illustrative embodiment.

FIG. 6 illustrates an example grouping pane of the GUI of FIG. 2 in an illustrative embodiment.

FIG. 7 illustrates an example task pane of the GUI of FIG. 2 for an individual component threading type in an illustrative embodiment.

FIG. 8 illustrates an example task pane of the GUI of FIG. 2 for a group-by-group threading type in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
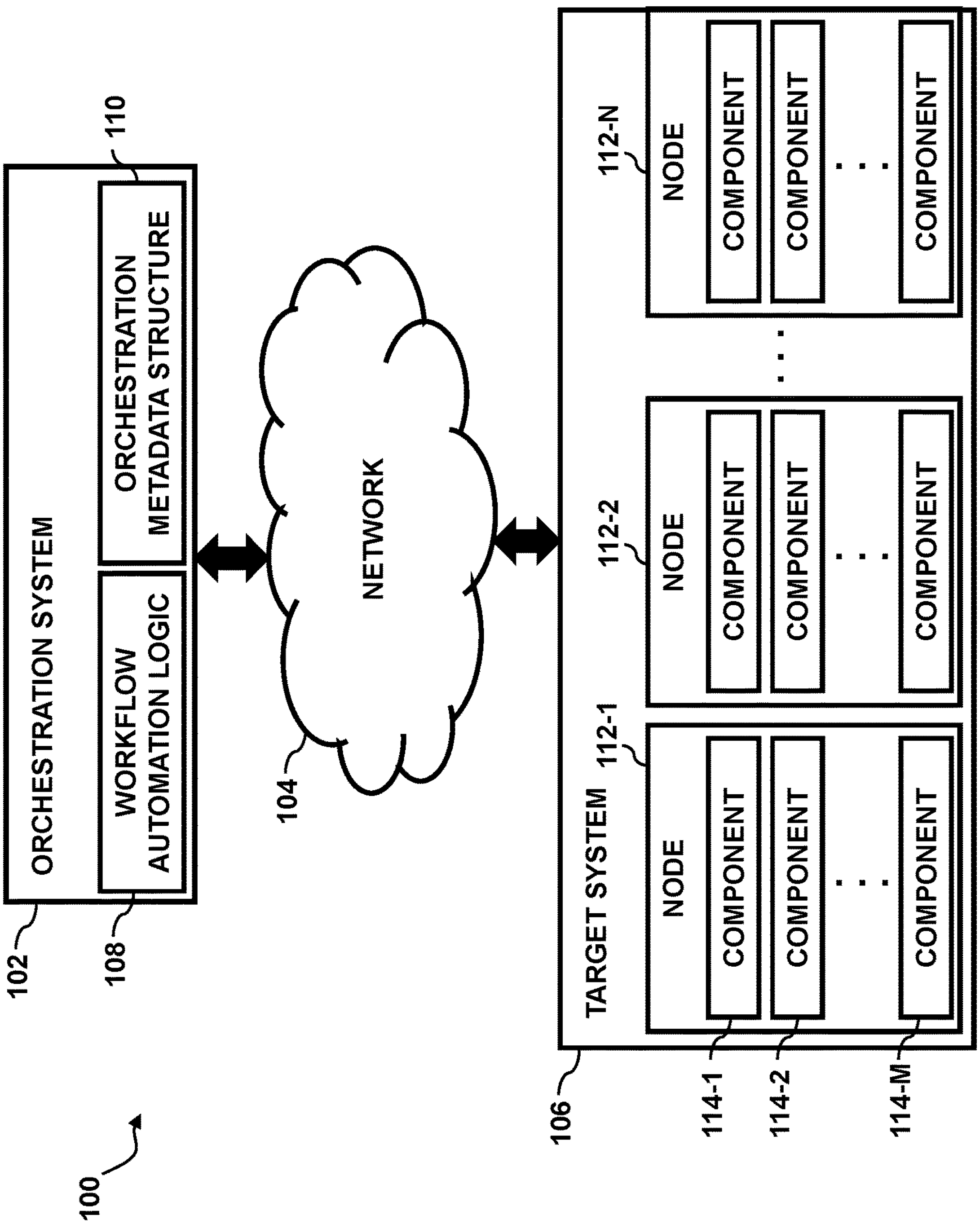
FIG. 1 is a block diagram of an information processing system in an illustrative embodiment.

FIG. 1 shows an information processing system 100 configured in accordance with an illustrative embodiment. The information processing system 100 comprises an orchestration system 102 that communicates over a network 104 with a target system 106. While only one orchestration system 102 and one target system 106 are illustrated, information processing system 100 may comprise any number of orchestration systems 102 and target systems 106. In some embodiments, the information processing system 100 is assumed to comprise an enterprise computer system, cloud-based computer system or other arrangement of multiple compute nodes associated with respective users. Although not explicitly shown in FIG. 1, one or more input-output devices such as keyboards, displays or other types of input-output devices may be used to support one or more user interfaces to the orchestration system 102 or assets thereof, as well as to support communication between the orchestration system 102 and other related systems and devices not explicitly shown.

The orchestration system 102 and target system 106 illustratively comprise respective processing devices of one or more processing platforms. For example, the orchestration system 102 and target system 106 can each comprise one or more processing devices each having a processor and a memory, possibly implementing virtual hosts such as, e.g., virtual machines, containers, virtual appliances, or other virtualization infrastructure, although numerous other configurations are possible.

The orchestration system 102 and target system 106 can additionally or alternatively be part of cloud infrastructure such as an Amazon Web Services (AWS) system. Other examples of cloud-based systems that can be used to provide one or more of orchestration system 102 and target system 106 include Google Cloud Platform (GCP) and Microsoft Azure.

The orchestration system 102 and target system 106 may be implemented on a common processing platform, or on separate processing platforms.

The orchestration system 102 is configured to perform workflow automation to configure components of the target system 106. In illustrative embodiments, the orchestration system 102 comprises workflow automation logic 108 and an orchestration metadata structure 110, the function of each of which will be described in more detail below.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The target system 106 is accessible to the orchestration system 102 over the network 104. The target system 106 comprises a plurality of nodes 112-1, 112-2 . . . 112-N on which workflow automation tasks may be performed. The nodes 112-1, 112-2 . . . 112-N may also be referred to herein collectively or individually as nodes(s) 112. Each node may comprise a plurality of components, e.g., components 114-1, 114-2 . . . 114-M for node 112-1, on which steps of the workflow automation tasks are executed by the workflow automation logic 108. The components of the nodes 112 may also be referred to herein collectively or individually as component(s) 114. The components 114 may comprise, for example, storage devices, processing devices, network devices, or other components. In some embodiments, for example, the target system 106 may comprise a storage system comprising a plurality of nodes 112 one or more of which may comprise, e.g., storage controllers, storage devices, processing devices, network adapters or other similar components 114. While target system 106 may be described as comprising particular configurations of nodes 112 and components 114 herein, target system 106 is not limited to the disclosed embodiments and may comprise any other configuration of electrical and software components.

The orchestration system 102 and target system 106 may be implemented on respective distinct processing platforms, although numerous other arrangements are possible. For example, in some embodiments at least portions of one or more of the orchestration system 102 and target system 106 are implemented on the same processing platform. In some embodiments, target system 106 can be implemented at least in part within at least one processing platform that implements at least a portion of the orchestration system 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the orchestration system 102 and target system 106 to reside in different data centers. Numerous other distributed implementations of one or both of the orchestration system 102 and target system 106 are possible.

It is to be appreciated that these and other features of illustrative embodiments are presented by way of example only and should not be construed as limiting in any way.

Accordingly, different numbers, types and arrangements of system components such as the orchestration system 102, network 104 and target system 106 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Illustrative embodiments are not limited to arrangements in which the functionality described herein is implemented in an orchestration system 102 and a target system 106, and therefore encompass various hybrid arrangements in which the functionality described herein is distributed over one or more orchestration systems and one or more associated target systems, each comprising one or more processing devices.

A workflow automation may be processed on the target system 106 by the workflow automation logic 108 in a tiered approach. In illustrated embodiments, for example, the workflow automation comprises an orchestration tier, a suborchestration tier, a workflow tier, a task tier, a step tier and a command tier. While described herein with respect to these six tiers, any other number of tiers may be utilized. For example, in some embodiments, a workflow automation may comprise the orchestration tier, task tier, step tier and command tier or any other combination of tiers.

An orchestration of the orchestration tier comprises one or more suborchestrations of the suborchestration tier in which each tier comprises one or more workflows of the workflow tier. The workflows each comprise one or more tasks of the task tier in which each tier comprises one or more steps of the step tier. Each step executes one or more commands on a component 114 or group of components 114 of a node 112 of the target system 106. In this manner, each tier is broken into subcomponents at the lower tiers.

The workflows are configured to process their corresponding tasks in a variety of different formats, e.g., one at a time, group-by-group or all at once. As will be described in further detail herein, users are able to dynamically select the individual suborchestrations, workflows, tasks and components for execution as part of the workflow automation on an as needed basis. For example, the user may select or unselect one or more suborchestrations, workflows, tasks or components for execution as part of the workflow automation. The steps break each task into smaller components and provide greater granularity in the logging of the progress of the workflow automation. In some embodiments, users are not enabled to individually select or unselect steps within a task for execution as part of the workflow automation. In other embodiments, individual steps may also be selected or unselected for execution.

In some embodiments, the workflow automation may be performed linearly. For example, suborchestrations, workflows, tasks, steps and commands may be performed in order. In other embodiments, at least part of the workflow automation may be performed in parallel.

In one example, workflow automation may be performed on nodes 112 of the target system 106 with a suborchestration broken into three workflows: collect/check, orchestration and post validation.

Collect/check comprises tasks, steps and commands for collecting information for the automation and pre-validating the components 114 of the nodes 112 to identify issues that may prevent the workflow automation from completing.

Orchestration comprises tasks, steps and commands for the configuration of the components 114 of the nodes 112.

Post validation comprises tasks, steps and commands for checking and collecting data for end state documentation and validation of the configuration changes to the components 114 of the nodes 112.

The workflow automation logic 108 utilizes metadata found in the orchestration metadata structure 110 for processing commands. For example, to obtain a list of the directory contents of a remote computing device, e.g., a node 112 of the target system 106, the workflow automation logic 108 will build a command string based on metadata input from the orchestration metadata structure and then execute the command. An example command may comprise, e.g., "& write-output y|.\bin\plink -ssh -pw password username@hostname ls/tmp 2>&1." For example, this command utilizes plink to SSH into the host 'hostname' with credentials 'username' and 'password' and executes the command "ls/tmp." An output from the command is added to a console output to be captured. For example, a write-output sends "y" to the console in case the certificate needs to be accepted. If a powershell console were opened and the same command was run the same result would be achieved.

In illustrative embodiments, the workflow automation logic 108 achieves this process through the use of the orchestration metadata structure 110. The use of the orchestration metadata structure 110 produces the same results through a set of instructions instead of through specific programming.

The orchestration metadata structure 110 comprises metadata corresponding to each of the tiers described above, e.g., orchestration, suborchestration, workflow, task, step and command.

Orchestration is the top-level object defining the name, description and version of the orchestration. In the metadata, a start and end tag are defined. An example of the metadata for an orchestration may comprise:

```
<orchestration name = "example" description = "Orchestration 1"
version = "1.0.0">
. . . .
</orchestration>
```

In some embodiments, the name may be a unique name while the description does not need to be unique, however, a non-unique description may result in the presentation of multiple orchestrations to a user with the same description.

The version is optional and may be utilized for tracking purposes.

Figure 2:
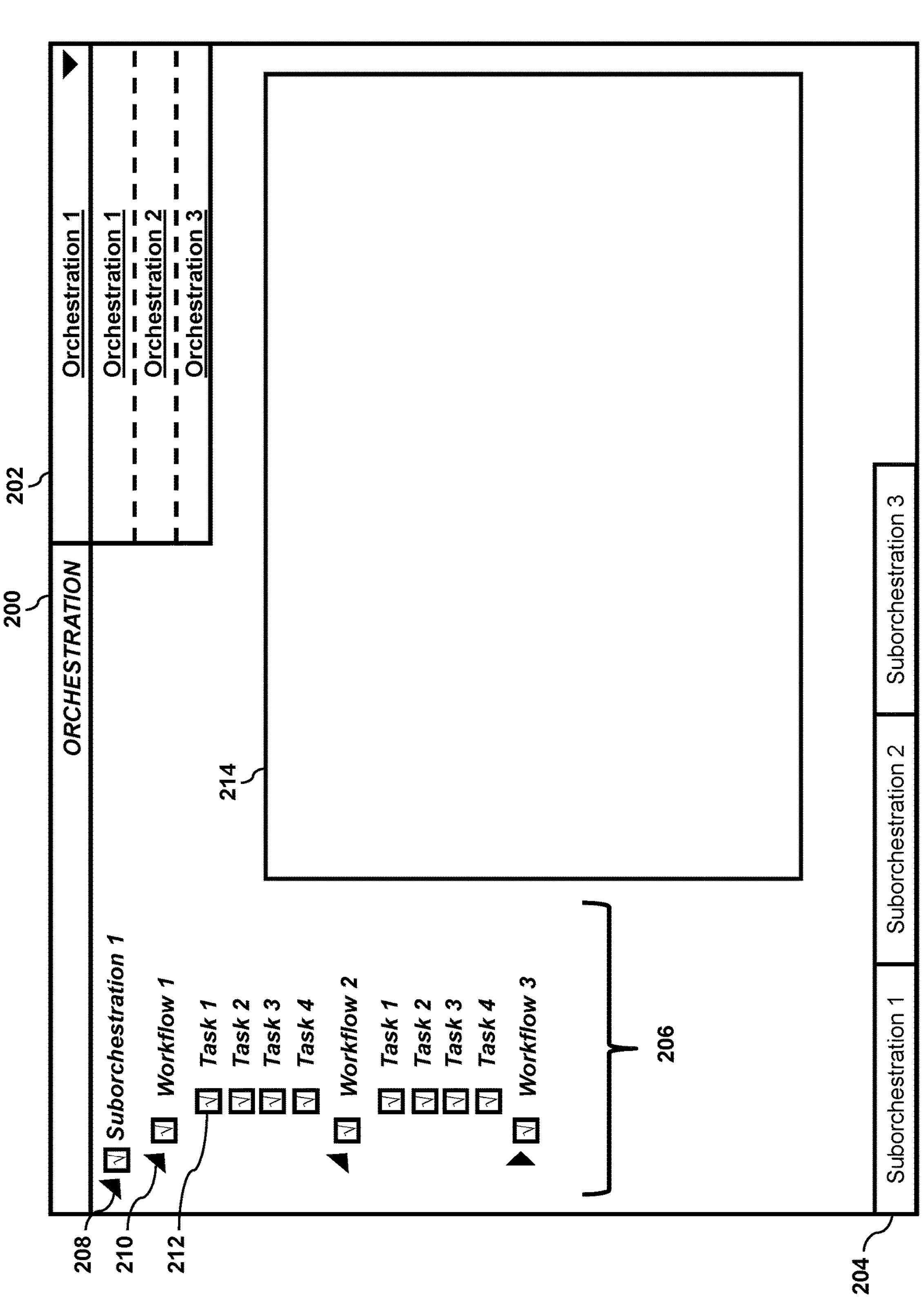
FIG. 2 illustrates an example GUI of the information processing system of FIG. 1 in an illustrative embodiment.

With reference to FIG. 2, a graphical user interface (GUI) 200 may be generated based on the orchestration metadata structure 110. As shown in FIG. 2, for example, creating an orchestration in the orchestration metadata structure 110 creates a new orchestration item 202 in the GUI 200 that matches the orchestration description. For example, the orchestration item 202 created using the above example metadata may be presented to a user via the GUI 200, e.g., in a drop-down menu, as a selectable tab or in any other manner.

The orchestration item 202 is activatable by the user to select the orchestration. Absent additional metadata in the orchestration metadata structure 110 for suborchestrations, workflows, etc., however, the activation of the orchestration item 202 may not present the user with additional visual information about the orchestration. For example, these items may be added through additional metadata configuration. The orchestration is used as a top-level object for organization of the workflow automation.

Suborchestration is a child object of an orchestration. Each orchestration may have multiple suborchestrations. In illustrative embodiments, each suborchestration may be presented as a suborchestration element 204 in the GUI 200, e.g., a tab or other element, that is selectable to view the suborchestration.

An example of the metadata for a suborchestration is provided below:

```
<suborchestration name = " Suborchestration 1" description =
"Suborchestration 1">
. . . .
</suborchestration>
```

The name is a unique name for the suborchestration. If a unique name is not utilized, multiple suborchestration elements 204 may have the same name and logging may include unexpected results. A target may be included that references a common suborchestration used in other orchestrations, for example, where a target is utilized, metadata for workflows, tasks, etc. for the suborchestration may be obtained by reference to another metadata file comprising the common suborchestration.

With the suborchestration added to the orchestration metadata structure 110, the GUI 200 presents suborchestration elements 204 to the user for selection, e.g., as tabs or other activatable elements. By activating one of the suborchestration elements 204, the user is presented with a tiered tree 206 for that suborchestration including a suborchestration heading 208 that comprises the suborchestration name "suborchestration 1." In some embodiments, the suborchestration heading 208 comprises an element that is activatable by a user of the GUI 200 to enable or disable execution of the suborchestration, e.g., a check box or other activatable element. Note that while workflows and tasks are illustrated in GUI 200 at this point, they will not be present until the corresponding metadata has been added to the orchestration metadata structure 110 for this sub orchestration.

Workflows are child objects of a suborchestration and define a grouping of tasks to be processed. Each suborchestration may have multiple workflows. Two examples of the metadata for a workflow are provided below:

Example 1

```
<workflow name = "Example" target="task 1" threading="group"
component=" Device type l"/>
```

Example 2

```
<workflow name="Verify iDRAC Version">
  <task name="Upgrade iDRAC" target="upgrade_idrac"
component=" Device type 1" onFail="break"/>
  </workflow>
```

The metadata for each workflow comprises a name that is used to reference the workflow for logging and reporting. The name does not need to be unique, but duplicate steps that have the same orchestration, suborchestration, workflow, task, and step may result in logs and reporting with the same identifiers. This may make it more difficult to decipher which workflows, tasks, steps or commands are causing an issue.

If the metadata for a workflow comprises a target, the workflow may reference a common listing of tasks found in another metadata file. Metadata for a workflow that comprises a target is shown in example 1 above. Example metadata for a workflow that does not comprise a target is shown in example 2 above and has separate metadata entries for tasks to be performed as part of that workflow.

If a workflow comprises threading, the threading indicates how the tasks of that workflow will be executed. For example, the threading may comprise an indication of all components, per component and group although other threading options may also be available.

An indication of all components in the threading field means that the workflow will execute on all of the components at the same time.

An indication of one component in the threading field means that the workflow will execute on one of the components at a time, e.g., based on component type. The one component threading may also include an indication of the component type.

An indication of group in the threading field means the workflow will execute on all components included in a particular group. For example, the order of execution may be based on unique group names in the order that they are sorted on the components tab shown in FIG. 3, which will be described in more detail below.

If threading is omitted, all components threading may be utilized as a default. In some embodiments, any other type of threading may be alternatively set as the default.

The component specifies which component will be used to iterate through the workflow.

For example, if the component is component 1, the workflow tasks will be executed on that component.

In some embodiments, the metadata for the workflow may comprise a role field which is an optional field to specify a component filter. For example, if the role field is set to tiebreaker then the workflow automation will run through each component of type component 1 that has a role equal to tiebreaker.

As seen in FIG. 2, once metadata for a workflow has been added to the orchestration metadata structure 110, a workflow subheading 210, e.g., workflow 1, is added to the tiered tree 206 under the suborchestration heading 208. Additional workflows may be added in a similar manner, e.g., workflows 2 and 3.

Tasks are child objects of a workflow and define a grouping of steps to be processed. Each workflow may have multiple tasks. An example of the metadata for a task are provided above in example 2 of the workflow metadata.

The metadata for a task defines the component, set of commands, filtering and any actions to be taken when a failure occurs.

The metadata for each task comprises a name that is used for logging and reporting. In some embodiments, the task name may be unique.

The onfail parameter tells the automation what action to perform when a failure occurs. For example, an onfail parameter of "break" tells the workflow automation to end when the task fails and not proceed to the next task. An onfail parameter of "continue" tells the workflow automation to proceed to the next step even when a task fails.

The component of the task metadata defines the component definition on which the task will be executed.

If a threading parameter is present, it will override the workflow threading. The threading parameter is optional for tasks.

A needed parameter indicates that commands need to be executed on other components as part of this task even if those components are outside the current filtering. For example, if master data management (MDM) commands need to be executed but none of the components in the current group are the primary MDM, the needed parameter may indicate that the commands will be run on the primary MDM.

A role parameter filters components based on specified role. The role parameter is optional.

An ifApplicable parameter tells the orchestration whether or not the selected components may be applicable which may be utilized to overcome potential issues during pre-validation. This parameter is also optional.

A target parameter comprises a reference to a task definition in a tasks metadata file that comprises a set of common tasks. This field is also optional.

A precheck parameter defines a command to run to verify if the proceeding steps should run or not. For example, if the precheck parameter is present, the indicated command is executed and if successful the proceeding steps for the task may be executed. The precheck parameter comprises a name for the precheck, a command to be run and an expression that comprises an evaluation of the result of the command.

A value parameter specifies which returned value is the target result, in the case that multiple values are returned from a command.

An ifTrue parameter defines a message to be displayed when the task is skipped.

As seen in FIG. 2, once metadata for a task has been added to the orchestration metadata structure 110, a task 212, e.g., task 1, is added to the tiered tree 206 under the workflow subheading 210. Additional tasks may be added in a similar manner. In addition, for each task, component information is provided in a component pane 214 based on the components identified in the task metadata. The component pane 214 is illustrated in further detail in FIG. 3. As seen in FIG. 3, for example, if a task has component parameters of “Device type 1,” “Device type 2” and “Device type 3,” information about components of “Device type 1,” “Device type 2” and “Device type 3” is shown in the component pane 214. For example, the information for each component may comprise an address 300, device type 302, type 304, role 306, group 308, step 310, progress 312, status 314, respective links for details 316 and log 318, or any other information about a component.

The address 300 may comprise, for example, an IP address, a link, or other information indication that identifies the component.

The device type 302 corresponds to the component parameter for that component, e.g., “Device type 1,” “Device type 2,” “Device type 3,” etc.

The type 304 indicates the type of the component, e.g., a storage component, virtualization component, collection component, compute component, or any other type of component.

The role 306 indicates the role of the component, e.g., MDM, software-defined storage (SDS), Tiebreaker, Customer, etc.

The group 308 indicates whether or not this component is part of a component grouping. For example, in FIG. 3 components are grouped into groups 308 including, e.g., G1, G2, F1, F3 and S5. The grouping may be utilized by the workflow or task to handle workflow automation execution order. For example, if the threading parameter indicates that the tasks will execute on components by group, the tasks may be executed on each group separately, e.g., all of the components of group G1 followed by all of the components of group G2, etc.

The step 310, progress 312, status 314, details 316 and log 318 are associated with the steps being performed for that task on the component. For example, metadata for steps may be defined in the orchestration metadata structure for each task.

Each step comprises a command that needs to be executed in order for a task to be completed. Some tasks require multiple commands to be run in order to complete. Each command is considered a task step.

A step name parameter defines a unique step name.

A step type parameter defines the type of the command that is being executed for that step.

For example, a type parameter of collect indicates that the command is configured to collect information. A data parameter may indicate that specified data will be stored in a database. If no data parameter is specified, the data may only be visible in a task results output. As another example, a type parameter of check indicates that the command is configured to collect data and then evaluate the response as true or false with a message. A check parameter defines the check metadata when evaluating if configure should be performed. A name parameter for the check comprises a unique name for the check. A command parameter indicates a command to be used to collect data for evaluation. An expression parameter indicates an evaluation for checking if the collected data is true or false. If a value parameter is included, the value parameter indicates which attribute is to be checked. An ifTrue parameter indicates the message to display when the result of the evaluation is true while an ifFalse parameter indicates the message to display when the result of the evaluation is false.

A type parameter of configure indicates that the command modifies a component. A type parameter of configure may also have an optional check command that causes the configure command to repeat until a repeat count is reached or a check value returns true.

A type parameter of report indicates that the command generates an output report based on previously collected data, e.g., data collected by a collect command.

A command parameter specifies the command to be executed on the component.

A repeat parameter defines how many times the command should repeat when evaluations return false. If no repeat parameter is present, the step may default to a single command execution. A wait parameter defines how long the command should wait before repeating.

An example of the metadata for a step is provided below:

<step name=“Check LIA/SDS” type=“collect” command=“checkfs”/>

The above example metadata for a step utilizes a pre-existing command, checkfs, which can be found in another metadata file, e.g., a file listing a set of common commands. In some embodiments, additional commands may be defined for a step using additional metadata.

Progress 312 shows the progress of the execution in the step, e.g., from 0% to 100% although other indications of progress may alternatively be utilized.

Status 314 indicates whether the step has started, is currently executing or has completed. Other status indications may alternatively be utilized in some embodiments.

Details 316 for each component are activatable to trigger a presentation of details for that component, e.g., in a details pane 400 as shown in FIG. 4. Details pane 400 shows details of the component including, e.g., which orchestrations, suborchestrations and workflows, tasks and steps are executing commands on that component, information about the component such as, e.g., role, address, device type and group information, and information about the workflows, tasks, steps and their status. For each step, an output may be activated to trigger a presentation of an output pane 402 as shown in FIG. 4 which provides additional output and logging information for that step.

Commands are defined in a component metadata profile. For example, the command “checkfs” may comprise metadata such as the following:

<command type=“plink” name=“checkfs” contentType=“string” cmd=“ls/tmp”/>

This metadata defines a new command that uses the command type definition “plink” with a name of checkfs. The contenttype indicates that the returned value is a string and the command that is executed is defined as “ls/tmp.” Once defined, the command may be referenced by other steps within the same orchestration metadata structure or by other orchestration metadata structures.

With reference now to FIG. 5, in some embodiments, information about the commands for each step on each component of each device type may be presented in a summary pane 500 which shows an estimated time to complete each command. The estimated time may be determined, for example, based on past executions of the command on that component or on similar components of the same device type. For example, the collect firmware command of the step “collect device type 1” of “orchestration 1” may have an average time of 00:00:32 based on historical run time for that component or in some embodiments for all components of that device type.

With reference now to FIG. 6, in some embodiments, components may be grouped together into groupings on which the workflows may be executed. For example, as shown in grouping pane 600, the components are grouped together into multiple groups including, e.g., group F1, group F2, group G1, group G2, group S1, group S3 or any other group. As mentioned above, if the threading parameter is present in the metadata for a workflow, the groupings may be utilized for the workflow based on the type of threading.

For example, as described above, the threading parameter comprises multiple options such as, e.g., all at once, group by group and individual.

The all at once (the default setting in some embodiments if the threading parameter is not specified) provides automation that begins against all components.

The group-by-group automation runs through each group one at a time. In some embodiments, those components that are not in a group may be skipped entirely. In other embodiments, those components that are not in a group may be run after all of the groups have run. In an example scenario, automation may be run against group F1, followed by groups F2, G1, G2, S1, S2 and any other groups in order. In some embodiments, when a workflow has a threading parameter, only those components that meet the threading parameter, e.g., are part of a group, etc., may be displayed as active components for that workflow in component pane 214.

The individual automation runs one component at a time.

With reference now to FIGS. 7 and 8, two example scenarios will now be described. FIG. 7 illustrates an individual automation treatment while FIG. 8 illustrates a group-by-group threading type of a workflow automation for a task "Upgrade Non-Primary."

As seen in the example of FIG. 7, a task pane 700 is presented in the GUI in which the group for the task is set to the address of the individual component to be run, i.e., 12.345.678.910.

Information about the component and the execution of the steps of that task are shown with reference to the component, e.g., device type, type, role, group, the step that is currently in progress, progress for the current step of the task, status and links for details and logging such as described above.

As seen in the example of FIG. 8, a task pane 800 is presented in the GUI in which the treatment of the tasks of the workflow are group by group. In this case, for the task "Upgrade Non-Primary" the group is F1 which comprises the component having the address "12.345.678.910" and the component having the address "10.987.654.321" in this example. As can be seen in FIG. 8, each of these components is progressing through the steps of the "Upgrade Non-Primary" task as a group.

Figure 9:
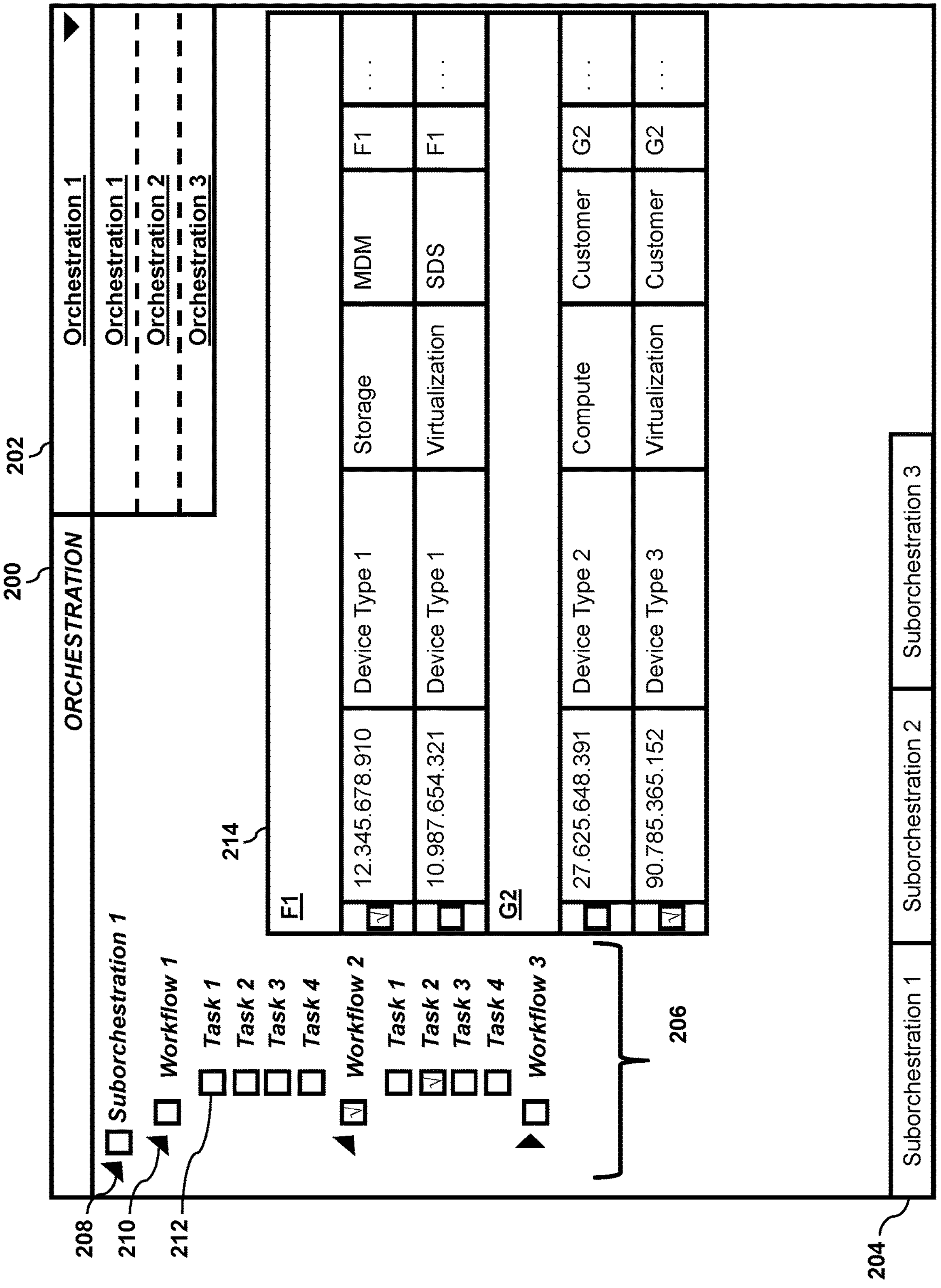
FIG. 9 illustrates an example of the GUI of FIG. 2 in which some workflows, tasks and components are disabled for the workflow automation in an illustrative embodiment.

With reference now to FIG. 9, filtering may be applied on a per task, per group or per component level. For example, tasks, groups or individual components may be selected or deselected for automation. In the example of FIG. 9, task 2 is selected for automation on components of groups F1 and G2. In particular, the component having an address of 12.345.678.910 in group F1 and the component having an address of 90.785.365.152 in group G2 are selected for the automation in the component pane 214 while the other components are not.

Workflow automation using the disclosed orchestration metadata structure and GUI provides flexibility in the case of undiscovered issues in the environment that interrupt the workflow automation and allow the end user to modify the task list as required or perform engagements on a small subset of components. For example, in some scenarios, one or more tasks may need to be run against components outside of the current group. In such a case, an override in the workflow automation that allows a task to ignore the workflow threading and run against components in a different group is needed.

In some embodiments, a workflow automation for a given task, step, etc. may also be configured to run regardless of whether the element is selected or unselected. This may be because the workflow automation is running against a first group, but the current management VM for the cluster is in a second group. In such a case it may be necessary to periodically run commands against the management VM even though this component is not included in the first group on which workflow automation tasks are being performed. However, while commands may need to be run against the management VM in the second group, other components in the second group may not need workflow automation at this time. In such a case, the second group as a whole may be deselected while only the management VM component in the second group may be selected for workflow automation. This functionality allows the workflow automation to run on the management VM component or other components outside of the first group as needed.

Figure 10:
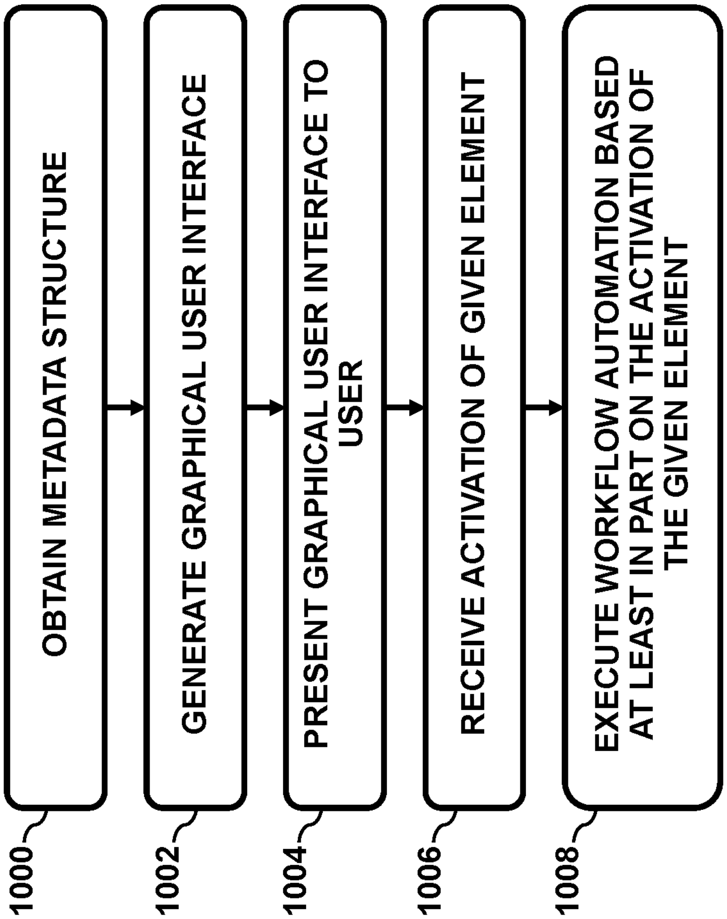
FIG. 10 illustrates an example flow diagram of a process for workflow automation in an illustrative embodiment.

FIG. 10 illustrates an example flow diagram of a process for workflow automation in an illustrative embodiment. The process as shown in FIG. 10 includes steps 1000 through 1008 and is suitable for use in the system 100 but is more generally applicable to other types of systems. The process will be described with reference also to FIGS. 1-9.

At step 1000, workflow automation logic 108 obtains a metadata structure corresponding to a workflow automation. For example, the metadata structure comprises orchestration metadata structure 110.

At step 1002, workflow automation logic 108 generates a GUI based at least in part on the metadata structure. The GUI is configured to present the plurality of tiers to a user. An example of the GUI comprises GUI 200. The GUI comprises a plurality of elements each of which is activatable by the user to enable or disable corresponding ones of the individual tasks and workflows for the workflow automation. For example, the plurality of elements may comprise elements 208, 210, 212 or any other activatable element described herein.

At step 1004, workflow automation logic 108 presents the GUI to a user of the apparatus.

At step 1006, workflow automation logic 108 receives, via the graphical user interface, from the user, an activation of a given element of the plurality of elements. The activation disables the corresponding individual task or workflow for the workflow automation. For example, as seen in FIG. 9, one or more workflows or tasks may be unselected by activation of the corresponding element in the GUI such as, e.g., unchecking the corresponding box.

At step 1008, workflow automation logic 108 executes the workflow automation based at least in part on the activation of the given element. For example, workflow automation logic 108 may execute those workflows and tasks that are enabled while not executing those workflows and tasks that are disabled, e.g., have their corresponding boxes unchecked.

It is to be understood that for any methodologies described herein with reference to the flow diagram of FIG. 10, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different information processing systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a computing device of a system such as orchestration system 102 or target system 106 that is configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of SSDs. In the case of the orchestration system 102 and target system 106, a given such processing device may correspond to one or more virtual machines or other types of virtualization infrastructure such as Docker containers or Linux containers (LXCs). The orchestration system 102 or target system 106, as well as other system components, may be implemented at least in part using processing devices of such processing platforms. For example, in a distributed implementation of the orchestration system 102 or target system 106, respective distributed modules of such an orchestration system 102 or target system 106 can be implemented in respective containers running on respective ones of the processing devices of a processing platform.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It should again be emphasized that the above-described embodiments are presented for purposes of illustration only. Many variations and other alternative embodiments may be used. For example, the disclosed techniques and functionality described above in the illustrative embodiments are applicable to a wide variety of other types of information processing systems, host devices, storage systems, backend support systems or other systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising at least one processing device comprising a processor coupled to memory, the at least one processing device being configured:

to obtain a metadata structure corresponding to a workflow automation, the workflow automation comprising a plurality of tasks, the metadata structure defining a plurality of tiers including:

a first tier comprising individual tasks that are part of the plurality of tasks;

a second tier comprising a plurality of workflows, each workflow comprising a corresponding grouping of at least a subset of the individual tasks of the first tier, wherein different ones of the workflows comprise respective different groupings of respective different subsets of the individual tasks of the first tier; and a third tier comprising a plurality of orchestrations, each orchestration comprising a corresponding grouping of at least a subset of the workflows of the second tier, wherein different ones of the orchestrations comprise respective different groupings of respective different subsets of the workflows of the second tier;

wherein the metadata structure comprises separate metadata portions corresponding to respective ones of the first tier, the second tier and the third tier, each of at least a subset of the separate metadata portions comprising one or more distinct objects of the corresponding tier with each such object being delimited in the metadata structure at least in part by a pairing of a start tag and an end tag that collectively indicate the corresponding tier and provide descriptive information of the delimited object, and further wherein at least a given one of the metadata portions comprises at least one target that references a common set of one or more tasks that are part of one or more other metadata portions in at least one metadata structure;

to generate a graphical user interface based at least in part on the metadata structure, the graphical user interface being configured to present the plurality of tiers to a user, the graphical user interface comprising a plurality of elements each activatable by the user to enable or disable corresponding ones of the individual tasks and workflows for the workflow automation;

to present the graphical user interface to a user of the apparatus;

to receive via the graphical user interface, from the user, an activation of a given element of the plurality of elements, the activation disabling the corresponding individual task or workflow for the workflow automation; and to execute the workflow automation based at least in part on the activation of the given element.

2. The apparatus of claim 1 wherein executing the workflow automation comprises executing the workflow automation on a target device, the target device comprising a plurality of components, each individual task of the plurality of tasks being configured for execution on one or more of the components.

3. The apparatus of claim 2 wherein the at least one processing device is configured to group the plurality of components together into one or more component groups, a given task of the plurality of tasks being configured for execution on each component in a given component group.

4. The apparatus of claim 3 wherein a given workflow of the plurality of workflows comprises an indication of an execution order type for the corresponding grouping of at least a subset of the individual tasks.

5. The apparatus of claim 4 wherein the indication of the execution order type comprises one of (i) one component at a time, (ii) component group by component group, with different component groups being executed at respective different times, and (iii) all components, with all components being executed at least in part concurrently with one another.

6. The apparatus of claim 5 wherein the at least one processing device is configured to execute the tasks of the workflow automation on corresponding component groups in order based at least in part on the indication that the execution order type comprises component group by component group.

7. The apparatus of claim 3 wherein:

the components of a given component group of the one or more component groups each have corresponding elements that are activatable to enable or disable workflow automation for those components for a given task of the plurality of tasks;

the at least one processing device is further configured to receive via the graphical user interface, from the user, an activation of the element corresponding to a given component of the given component group, the activation disabling the workflow automation for the given component for the given task.

8. A method comprising:

obtaining a metadata structure corresponding to a workflow automation, the workflow automation comprising a plurality of tasks, the metadata structure defining a plurality of tiers including:

a first tier comprising individual tasks that are part of the plurality of tasks;

a second tier comprising a plurality of workflows, each workflow comprising a corresponding grouping of at least a subset of the individual tasks of the first tier, wherein different ones of the workflows comprise respective different groupings of respective different subsets of the individual tasks of the first tier; and a third tier comprising a plurality of orchestrations, each orchestration comprising a corresponding grouping of at least a subset of the workflows of the second tier, wherein different ones of the orchestrations comprise respective different groupings of respective different subsets of the workflows of the second tier;

wherein the metadata a structure comprises separate metadata portions corresponding to respective ones of the first tier, the second tier and the third tier, each of at least a subset of the separate metadata portions comprising one or more distinct objects of the corresponding tier with each such object being delimited in the metadata structure at least in part by a pairing of a start tag and an end tag that collectively indicate the corresponding tier and provide descriptive information of the delimited object, and further wherein at least a given one of the metadata portions comprises at least one target that references a common set of one or more tasks that are part of one or more other metadata portions in at least one metadata structure;

generating a graphical user interface based at least in part on the metadata structure, the graphical user interface being configured to present the plurality of tiers to a user, the graphical user interface comprising a plurality of elements each activatable by the user to enable or disable corresponding ones of the individual tasks and workflows for the workflow automation;

presenting the graphical user interface to a user;

receiving via the graphical user interface, from the user, an activation of a given element of the plurality of elements, the activation disabling the corresponding individual task or workflow for the workflow automation; and executing the workflow automation based at least in part on the activation of the given element;

wherein the method is implemented by at least one processing device comprising a processor coupled to memory.

9. The method of claim 8 wherein executing the workflow automation comprises executing the workflow automation on a target device, the target device comprising a plurality of components, each individual task of the plurality of tasks being configured for execution on one or more of the components.

10. The method of claim 9 wherein the method further comprises grouping the plurality of components together into one or more component groups, a given task of the plurality of tasks being configured for execution on each component in a given component group.

11. The method of claim 10 wherein a given workflow of the plurality of workflows comprises an indication of an execution order type for the corresponding grouping of at least a subset of the individual tasks.

12. The method of claim 11 wherein the indication of the execution order type comprises one of (i) one component at a time, (ii) component group by component group, with different component groups being executed at respective different times, and (iii) all components, with all components being executed at least in part concurrently with one another.

13. The method of claim 12 wherein the method further comprises executing the tasks of the workflow automation on corresponding component groups in order based at least in part on the indication that the execution order type comprises component group by component group.

14. The method of claim 10 wherein:

the components of a given component group of the one or more component groups each have corresponding elements that are activatable to enable or disable workflow automation for those components for a given task of the plurality of tasks;

the method further comprising receiving via the graphical user interface, from the user, an activation of the element corresponding to a given component of the given component group, the activation disabling the workflow automation for the given component for the given task.

15. A computer program product comprising a non-transitory processor-readable storage medium having stored therein program code of one or more software programs, wherein the program code when executed by at least one processing device, the at least one processing device comprising a processor coupled to memory, causes the at least one processing device:

to obtain a metadata structure corresponding to a workflow automation, the workflow automation comprising a plurality of tasks, the metadata structure defining a plurality of tiers including:

a first tier comprising individual tasks that are part of the plurality of tasks;

a second tier comprising a plurality of workflows, each workflow comprising a corresponding grouping of at least a subset of the individual tasks of the first tier, wherein different ones of the workflows comprise respective different groupings of respective different subsets of the individual tasks of the first tier; and a third tier comprising a plurality of orchestrations, each orchestration comprising a corresponding grouping of at least a subset of the workflows of the second tier, wherein different ones of the orchestrations comprise respective different groupings of respective different subsets of the workflows of the second tier;

wherein the metadata structure comprises separate metadata portions corresponding to respective ones of the first tier, the second tier and the third tier, each of at least a subset of the separate metadata portions comprising one or more distinct objects of the corresponding tier with each such object being delimited in the metadata structure at least in part by a pairing of a start tag and an end tag that collectively indicate the corresponding tier and provide descriptive information of the delimited object, and further wherein at least a given one of the metadata portions comprises at least one target that references a common set of one or more tasks that are part of one or more other metadata portions in at least one metadata structure;

to generate a graphical user interface based at least in part on the metadata structure, the graphical user interface being configured to present the plurality of tiers to a user, the graphical user interface comprising a plurality of elements each activatable by the user to enable or disable corresponding ones of the individual tasks and workflows for the workflow automation;

to present the graphical user interface to a user;

to receive via the graphical user interface, from the user, an activation of a given element of the plurality of elements, the activation disabling the corresponding individual task or workflow for the workflow automation; and to execute the workflow automation based at least in part on the activation of the given element.

16. The computer program product of claim 15 wherein executing the workflow automation comprises executing the workflow automation on a target device, the target device comprising a plurality of components, each individual task of the plurality of tasks being configured for execution on one or more of the components.

17. The computer program product of claim 16 wherein the program code further causes the at least one processing device to group the plurality of components together into one or more component groups, a given task of the plurality of tasks being configured for execution on each component in a given component group.

18. The computer program product of claim 17 wherein a given workflow of the plurality of workflows comprises an indication of an execution order type for the corresponding grouping of at least a subset of the individual tasks, the indication comprising one of (i) one component at a time, (ii) component group by component group, with different component groups being executed at respective different times, and (iii) all components, with all components being executed at least in part concurrently with one another.

19. The computer program product of claim 18 wherein the program code further causes the at least one processing device to execute the tasks of the workflow automation on corresponding component groups in order based at least in part on the indication that the execution order type comprises component group by component group.

20. The computer program product of claim 17 wherein:

the components of a given component group of the one or more component groups each have corresponding elements that are activatable to enable or disable workflow automation for those components for a given task of the plurality of tasks; and the program code further causes the at least one processing device to receive via the graphical user interface, from the user, an activation of the element corresponding to a given component of the given component group, the activation disabling the workflow automation for the given component for the given task.

* * * * *